(12) United States Patent
Kariyama et al.

(10) Patent No.: US 9,643,682 B2
(45) Date of Patent: May 9, 2017

(54) HYDRAULIC OPERATING DEVICE

(71) Applicant: Shimano Inc., Sakai, Osaka (JP)

(72) Inventors: Osamu Kariyama, Sakai (JP); Takuma Sakai, Sakai (JP); Masahiro Nakakura, Sakai (JP)

(73) Assignee: SHIMANO INC., Osaka (JP)

( * ) Notice: Subject to any disclaimer, the term of this patent is extended or adjusted under 35 U.S.C. 154(b) by 0 days.

(21) Appl. No.: 14/642,773

(22) Filed: Mar. 10, 2015

(65) Prior Publication Data

US 2015/0321725 A1 Nov. 12, 2015

Related U.S. Application Data

(60) Provisional application No. 61/990,717, filed on May 9, 2014.

(51) Int. Cl.
*B62K 23/06* (2006.01)
*B62L 3/02* (2006.01)

(52) U.S. Cl.
CPC .............. *B62K 23/06* (2013.01); *B62L 3/023* (2013.01); *B62L 3/02* (2013.01); *Y10T 74/20396* (2015.01)

(58) Field of Classification Search
CPC .................................. B62K 23/06; B62L 3/023
See application file for complete search history.

(56) References Cited

U.S. PATENT DOCUMENTS

| 2,741,896 | A | * | 4/1956 | Geiger | B60T 11/22 188/152 |
|---|---|---|---|---|---|
| 5,678,665 | A | * | 10/1997 | Debreczeni | B60T 11/16 188/196 M |
| 7,516,616 | B2 | * | 4/2009 | Tetsuka | B60T 7/102 60/533 |
| 2003/0121736 | A1 | * | 7/2003 | Lumpkin | B60T 7/102 188/151 R |
| 2007/0283691 | A1 | | 12/2007 | Tetsuka et al. | |
| 2009/0008198 | A1 | * | 1/2009 | Jinbo | B60T 11/046 188/344 |
| 2012/0222416 | A1 | * | 9/2012 | Hirose | B62L 3/023 60/594 |

FOREIGN PATENT DOCUMENTS

DE EP 1398259 A2 * 3/2004 ............... B60T 7/10

* cited by examiner

*Primary Examiner* — Vicky Johnson

(57) ABSTRACT

A hydraulic operating device includes a base member, a hydraulic cylinder provided on the base member and having a bore, a piston located in the bore to move between an initial position and an actuated position, a lever pivotally coupled to the base member around a lever axis for pivotal movement between a rest position and an operated position and including a contact portion, and a connecting member configured to connect the lever to the piston such that the piston is pulled from the initial position to the actuated position in response to the pivotal movement of the lever from the rest position to the operated position. The connecting member has a first end portion coupled to the piston and a second end portion configured to displaceably contact with the contact portion of the lever.

11 Claims, 4 Drawing Sheets

HYDRAULIC OPERATING DEVICE

FIELD

The present invention relates to a hydraulic operating device, for example, a hydraulic operating device for a bicycle hydraulic brake.

BACKGROUND

In one example of a hydraulic operating device for a bicycle hydraulic brake, a piston is moved in a hydraulic cylinder from an initial position to an actuated position when an operating portion such as a brake lever is pivoted. Movement of the piston discharges fluid (oil, for example) from the hydraulic cylinder to drive a piston in a brake caliper, which is connected to the hydraulic cylinder by a hydraulic hose. This generates a braking force with the brake caliper.

SUMMARY

It is an object of the present invention to provide a hydraulic operating device having a novel structure.

One aspect of the present disclosure is a hydraulic operating device including a base member, a hydraulic cylinder provided on the base member and having a bore, a piston located in the bore to move between an initial position and an actuated position, a lever pivotally coupled to the base member around a lever axis for pivotal movement between a rest position and an operated position. The lever includes a contact portion. A connecting member is configured to connect the lever to the piston such that the piston is pulled from the initial position to the actuated position in response to the pivotal movement of the lever from the rest position to the operated position. The connecting member has a first end portion coupled to the piston and a second end portion configured to displaceably contact with the contact portion of the lever.

In a certain example, the connecting member contacts with the contact portion such that a distance between the lever axis and the second end portion is decreased in response to the pivotal movement of the lever from the rest position to the operated position.

In a certain example, the second end portion of the connecting member includes at least one roller configured to rotatably contact with the contact portion.

In a certain example, the contact portion includes at least one cam surface configured to contact with the at least one roller.

In a certain example, the second end portion includes a first roller and a second roller.

In a certain example, the first roller and the second roller are rotationally supported on opposite sides with respect to a longitudinal axis of the connecting member.

In a certain example, the connecting member further includes an intermediate portion between the first end portion and the second end portion, the intermediate portion having a first part fixedly coupled to the piston and a second part pivotally connected to the first part.

In a certain example, the lever further includes an operating portion configured to be pivotally coupled to the contact portion around an adjusting axis and an adjusting structure configured to adjust the relative position between the contact portion and the operating portion around the adjusting axis.

In a certain example, the adjusting axis is coaxial with the lever axis.

In a certain example, the base member is attached to a handlebar having an handlebar axis, and the bore of the hydraulic cylinder extends along a bore axis which is non-parallel to the handlebar axis.

In a certain example, the bore axis is substantially perpendicular to the handlebar axis.

In a certain example, the contact portion includes a cam surface located between the second end portion and the piston.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF EMBODIMENTS

Figure 1:
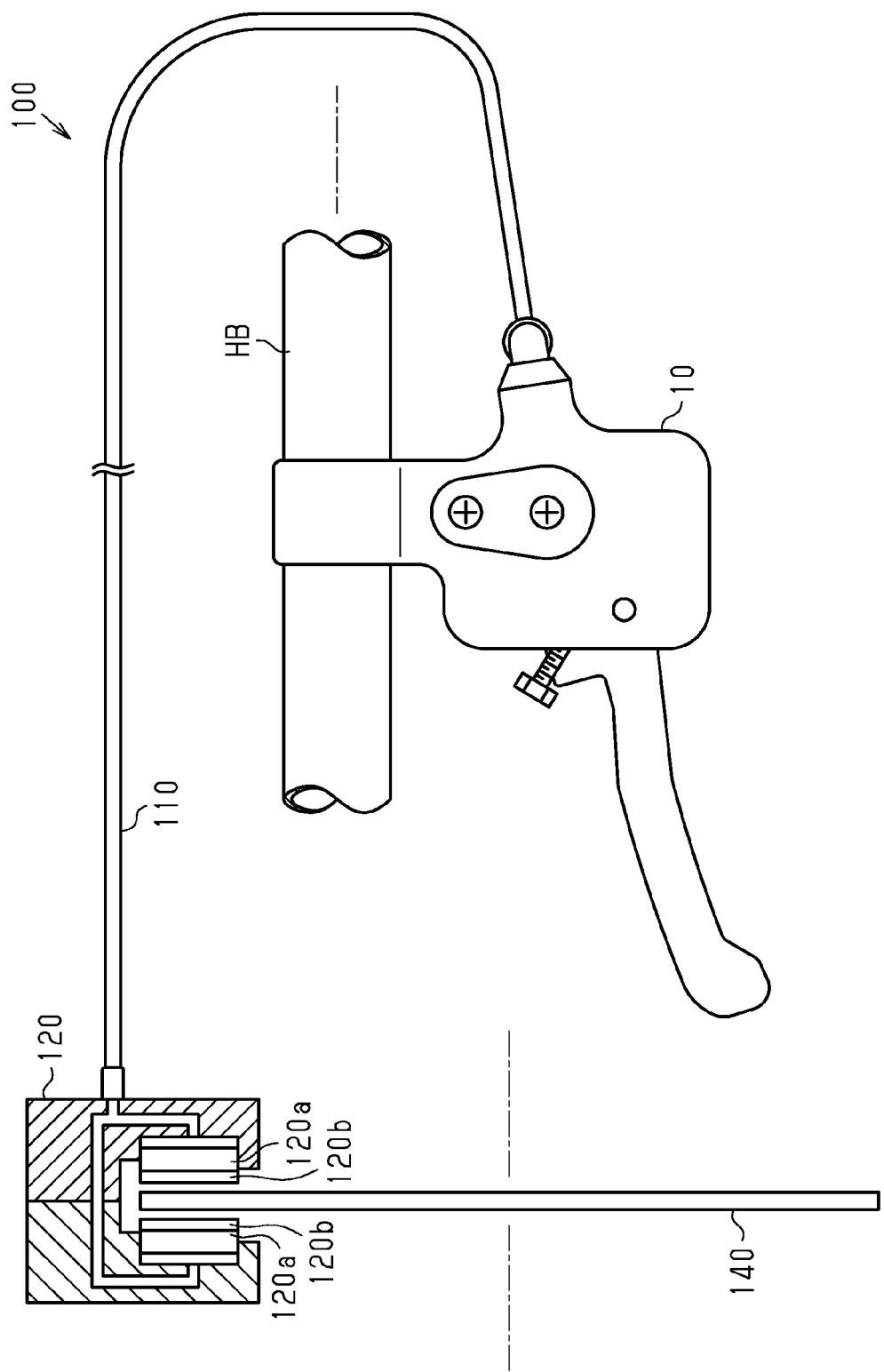
FIG. 1 is a schematic diagram showing a hydraulic system including a hydraulic operating device according to one embodiment.

A hydraulic operating device 10 according to one embodiment of the present invention will now be described. Referring to FIG. 1, the hydraulic operating device 10 may be used in a hydraulic system such as a bicycle hydraulic brake system 100.

The bicycle hydraulic brake system 100 includes the hydraulic operating device 10, a hydraulic hose 110, and a brake caliper 120. The hydraulic operating device 10 is attached to a handlebar HB fixed to a bicycle stem, for example. The hydraulic hose 110 (hydraulic line) connects the hydraulic operating device 10 and the brake caliper 120 in a manner allowing for fluid communication. The hydraulic operating device 10 includes a piston (master piston), which will be described later. The brake caliper 120 includes pistons 120a (slave piston) that push brake pads 120b. The pistons 120a move in accordance with the operation of the hydraulic operating device 10 and push the brake pads 120b against a rotor 140. This generates braking force with the brake caliper 120. Known components are used as the hydraulic hose 110, the brake caliper 120, the handlebar HB, and the rotor 140. Thus, these components will not be described in detail.

The hydraulic operating device 10 will now be described with reference to FIGS. 2 and 3. The hydraulic operating device 10 includes a base member 20, a hydraulic cylinder 30, a piston 40, a lever 50, and a connecting member 60. The hydraulic cylinder 30, which is provided on the base member 20, includes a bore 30a. The piston 40 (master piston) is arranged in the bore 30a of the hydraulic cylinder 30 to move between an initial position and an actuated position. The lever 50 is coupled to the base member 20 to be pivotal about a lever axis LA between a rest position and an operated position. The lever 50 includes a contact portion 52. The connecting member 60 is configured to connect the lever 50 and the piston 40 so that the piston 40 is pulled from the initial position to the actuated position when the lever 50 is pivoted from the rest position to the operated position. That is, the hydraulic operating device 10 is configured as a pull-type device that generates hydraulic force by pulling the piston 40. The connecting member 60 includes a first end portion 60*a*, which is coupled to the piston 40, and a second end portion 60*b*, which is configured to displaceably contact the contact portion 52 of the lever 50.

The base member 20 may include a bar clamp 22 attached to the handlebar HB. When the base member 20 is attached to the handlebar HB, which has a handlebar axis HBA, the hydraulic cylinder 30 extends along the bore axis BA, which is non-parallel to the handlebar axis HBA. In this embodiment, the bore axis BA is substantially perpendicular to the handlebar axis HBA.

The hydraulic cylinder 30 is connected via a discharge port 30*b* to the hydraulic hose 110. The hydraulic cylinder 30 may include a fluid reservoir 32. As shown in FIG. 2, when the lever 50 is located at the rest position and the piston 40 is located at the initial position, the fluid reservoir 32 is in communication with the bore 30*a* through a reservoir port 32*a*.

Figure 3:
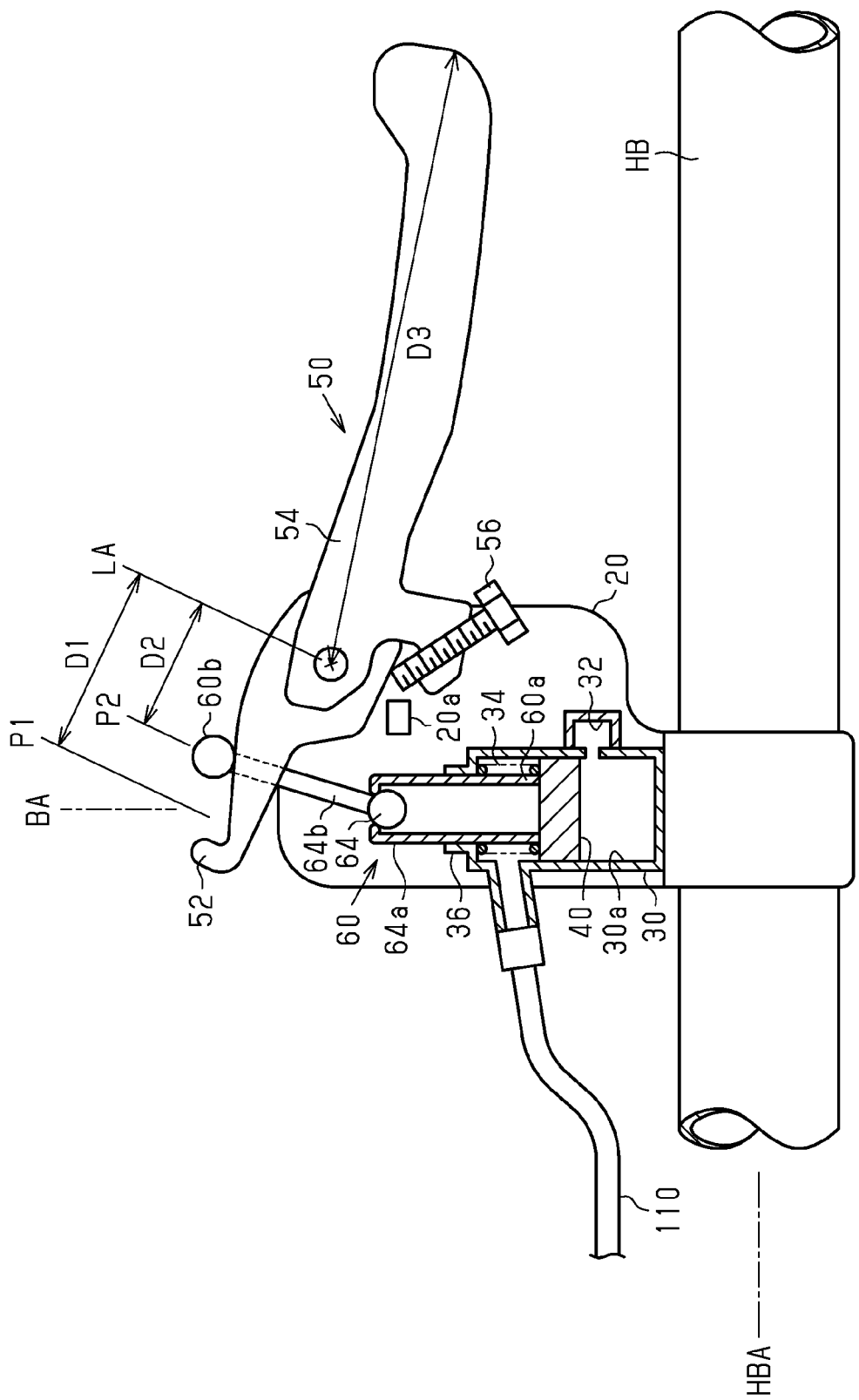
FIG. 3 is a partial cross-sectional view schematically showing the hydraulic operating device of FIG. 1 when the lever is located at an operated position.

As shown in FIG. 3, when the lever 50 is moved to the operated position and the piston 40 is moved to the actuated position, the piston 40 first covers the reservoir port 32*a* and then blocks the communication of the fluid reservoir 32 and the bore 30*a*. In this embodiment, the reservoir port 32*a* is separated from the initial position of the piston 40 by a predetermined distance. When necessary, a plurality of seal elements such as O-rings (not shown) may be arranged on the circumferential surface of the piston 40.

A piston return spring 34 urges the piston 40 toward the initial position. The piston return spring 34 may be, for example, a compression spring arranged in the bore 30*a* and engaged with or connected to the piston 40 and the hydraulic cylinder 30.

The hydraulic cylinder 30 may include a guide sleeve 36 that receives the connecting member 60 so that the connecting member 60 is movable in the axial direction. When necessary, the guide sleeve 36 may include a seal element such as an O-ring to reduce fluid leakage from the hydraulic cylinder 30.

The connecting member 60 functions as a pulling element that transmits tension between the piston 40 and the contact portion 52 of the lever 50. For example, when the lever 50 is pivoted from the rest position to the operated position, the connecting member 60 pulls the piston 40 from the initial position to the actuated position. When the lever 50 is released, the connecting member 60 pulls the lever 50 from the operated position to the rest position with the urging force of the piston return spring 34.

Figure 2:
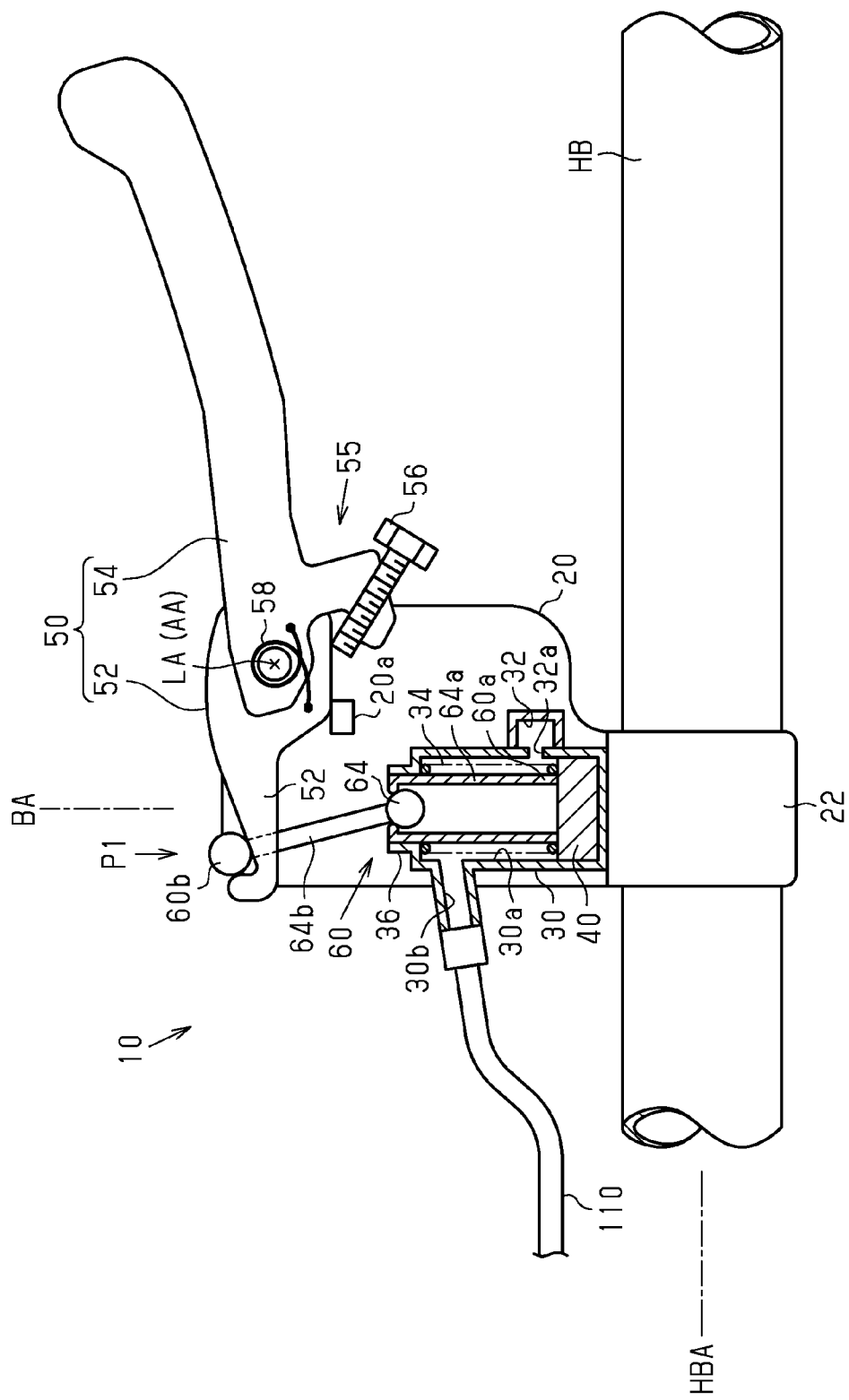
FIG. 2 is a partial cross-sectional view schematically showing the hydraulic operating device of FIG. 1 when a lever is located at a rest position.

As shown in FIG. 2, when the lever 50 is located at the rest position, the second end portion 60*b* of the connecting member 60 contacts the contact portion 52 of the lever 50 at position P1. As shown in FIG. 3, when the lever 50 is located at the operated position, the second end portion 60*b* of the connecting member 60 contacts the contact portion 52 at position P2. The second end portion 60*b* moves or slides between position P1 and position P2 while contacting the contact portion 52 when the lever 50 pivots. A first distance D1 between the lever axis LA and position P1 differs from a second distance D2 between the lever axis LA and position P2. This allows the pull-type hydraulic operating device 10 to include a plurality of lever ratios or a lever ratio that is varied when the lever 50 pivots. In the present specification, the lever ratio is defined as the piston stroke (PS) relative to the pivot angle (θ) of the lever 50 (PS/θ).

Preferably, the connecting member 60 and the contact portion 52 are in contact so that the distance decreases between the second end portion 60*b* of the connecting member 60 and the lever axis LA when the lever 50 is pivoted from the rest position to the operated position. In this embodiment, a distance D3 between the lever axis LA and the lever end is fixed, and position P2 is closer to the lever axis LA than position P1. Accordingly, the first distance ratio D3/D1 when the lever 50 is located at the rest position is smaller than the second distance ratio D3/D2 when the lever 50 is located at the operated position.

Figure 4:
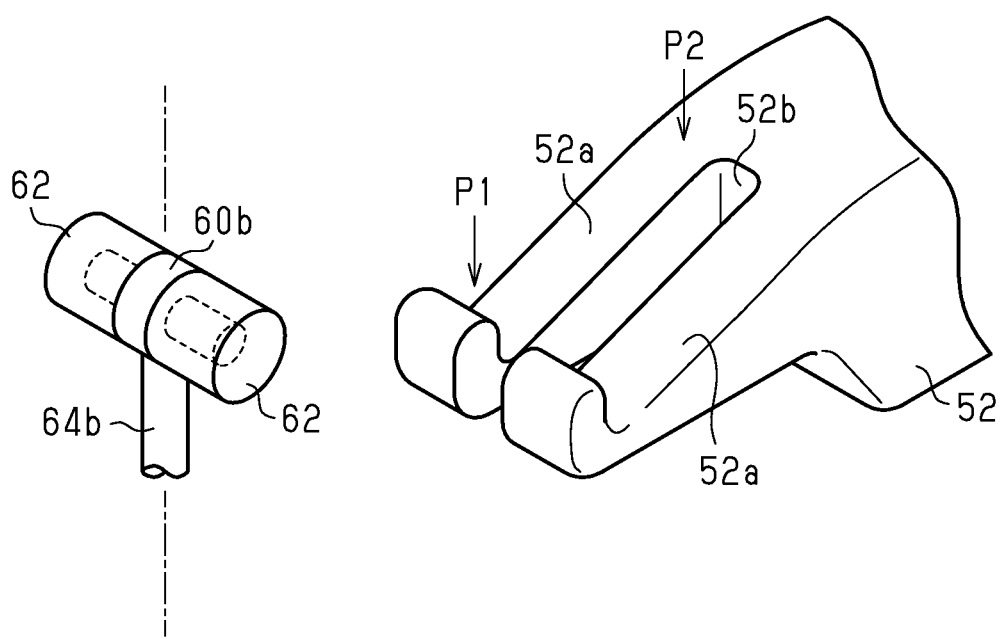
FIG. 4 is a perspective view showing a roller and a cam surface.

The second end portion 60*b* of the connecting member 60 is not particularly limited in shape as long as the second end portion 60*b* is slidable along the contact portion 52. Referring to FIG. 4, in this embodiment, the second end portion 60*b* includes at least one roller 62 configured to rotatably contact the contact portion 52. The second end portion 60*b* of the connecting member 60 includes first and second rollers 62. The first and second rollers 62 are rotatably supported on opposite sides of the longitudinal axis of the connecting member 60. Pins project in opposite directions from the second end portion 60*b* to support the two rollers 62.

The connecting member 60 may include an intermediate portion 64 between the first end portion 60*a* and the second end portion 60*b*. The intermediate portion 64 may include a first part 64*a*, which is fixedly coupled to the piston 40, and a second part 64*b*, which is pivotally connected to the first part 64*a*. Referring to FIG. 4, the second part 64*b* is received in a slit 52*b* of the contact portion 52. The intermediate portion 64 allows the connecting member 60 to bend and increases flexibility for the layout of the piston 40 and the contact portion 52. The second part 64*b* may be connected to the first part 64*a* by, for example, a ball joint or a pin.

The contact portion 52 of the lever 50 includes a cam surface 52*a*, which is located between the second end portion 60*b* and the piston 40. The contact portion 52 may include at least one cam surface 52*a*, which is configured to contact a roller 62 of the connecting member 60. As shown in FIG. 4, in this embodiment, the contact portion 52 includes two cam surfaces 52*a* respectively corresponding to the first and second rollers 62. Further, in this embodiment, the cam surfaces 52*a* are substantially flat surfaces. However, the cam surfaces 52*a* may be set to have any shape (curvature).

The lever 50 further includes an operating portion 54 such as a hand lever arm. The lever 50 may be a single-piece component integrally including the contact portion 52 and the operating portion 54. Alternatively, the contact portion 52 and the operating portion 54 may be discrete components. As shown in FIG. 2, in this embodiment, the operating portion 54 is coupled to the contact portion 52 pivotally about an adjustment axis AA. Preferably, the lever 50 further includes an adjustment structure 55 configured to adjust the relative positions of the contact portion 52 and the operating portion 54 about the adjustment axis AA. As shown in FIG. 2, in this embodiment, the adjustment axis AA is coaxial with the lever axis LA. The hydraulic operating device may be formed so that two different pins respectively have the adjustment axis and the lever axis.

The adjustment structure 55 may be the so-called reach adjustment mechanism, which is known in the field of bicycle hydraulic brakes. The adjustment structure 55 includes a bolt 56 and an urging member 58. The bolt 56 is mated with a threaded hole in the operating portion 54. The urging member 58 includes one end coupled to the operating portion 54 and another end coupled to the contact portion 52. The urging member 58 urges the operating portion 54 about the adjustment axis AA in the clockwise direction as viewed in FIG. 2 so that the distal end of the bolt 56 contacts the contact portion 52. The urging member 58 may be a torsion spring wound about the adjustment axis. The head of the bolt 56 is rotated to adjust the relative positions of the contact portion 52 and the operating portion 54.

The adjustment structure 55 is advantageous when adjusting the distance of the operating portion 54 and the handlebar HB in accordance with the preference or hand size of the rider.

When the lever 50 contacts a lever stopper 20a, which is arranged in the base member 20, the operating portion 54 may receive external force about the adjustment axis AA in the counterclockwise direction as viewed in FIG. 2. In this case, the urging member 58 of the adjustment structure 55 permits the operating portion 54 to resiliently pivot in the counterclockwise direction from the adjusted position and restores the operating portion 54 to the adjusted position.

The advantages of the hydraulic operating device 10 according to the present invention will now be described.

(1) The connecting member 60 is configured to connect the lever 50 and the piston 40 so that the piston 40 is pulled from the initial position to the actuated position when the lever 50 is pivoted from the rest position to the operated position. The connecting member 60 includes the first end portion 60a, which is coupled to the piston 40, and the second end portion 60b, which is configured to displaceably contact the contact portion 52 of the lever 50. This structure allows for the pull-type hydraulic operating device 10 to have a variable lever ratio.

(2) The connecting member 60 contacts the contact portion 52 so that the distance between the second end portion 60b of the connecting member 60 and the lever axis LA decreases when the lever 50 is pivoted from the rest position to the operated position. In this structure, the first distance ratio D3/D1 when the lever 50 is located at the rest position is smaller than the second distance ratio D3/D2 when the lever 50 is located at the operated position. Accordingly, as the lever 50 pivots from the rest position to the operated position, the rider can reduce the operating force applied to the lever 50 to generate braking force.

Further, the first lever ratio (PS/θ) is relatively large when the lever 50 is located at or in the vicinity of the rest position. This allows the piston 40 to quickly move from the initial position to a closed position where the piston completely covers the reservoir port 32a, and the discharge of fluid from the discharge port 30b may be started at an earlier timing. Consequently, an angle of play may be ensured for the lever, and, at the same time, the braking response may be improved.

Further, the second lever ratio is relatively small when the lever 50 is located at or on the vicinity of the operated position. This allows for fine adjustment of the braking force.

(3) The second end portion 60b of the connecting member 60 includes at least one roller 62, which is configured to rotatably contact the contact portion 52. In this structure, the roller 62 can reduce friction between the connecting member 60 and the contact portion 52. For example, the distance between the second end portion 60b of the connecting member 60 and the lever axis LA may be smoothly decreased when the lever 50 is pivoted from the rest position to the operated position. Further, the lever 50 may be smoothly returned to the rest position.

(4) The contact portion 52 includes at least one cam surface 52a that is configured to contact the roller 62. This structure allows the roller 62 to roll along the cam surface 52a while contacting the cam surface 52a. The roller 62 and the cam surface 52a cooperate to allow for smooth conversion between the pivoting of the lever 50 and the linear reciprocation of the piston 40. Further, the lever ratio may be continuously varied when the lever 50 is pivoted.

(5) The second end portion 60b of the connecting member 60 includes the first and second rollers 62. This structure allows for the second end portion 60b and the contact portion 52 to be in stable contact. Further, the second end portion 60b may be stably moved on the contact portion 52.

(6) The first and second rollers 62 are rotatably supported on opposite sides of the longitudinal axis of the connecting member 60. This structure allows the first and second rollers 62 to contact the contact portion 52 at symmetric positions. Further, the second end portion 60b and the contact portion 52 may be in stable contact, and the second end portion 60b may be stably moved on the contact portion 52.

(7) The connecting member 60 may include the intermediate portion 64 between the first end portion 60a and the second end portion 60b. Further, the intermediate portion 64 includes the first part 64a, which is fixedly coupled to the piston 40, and the second part 64b, which is pivotally connected to the first part 64a. The intermediate portion 64 allows for bending of the connecting member 60 and improves the flexibility for the layout of the piston 40 and the contact portion 52.

(8) The lever 50 further includes the operating portion 54, which is coupled to the contact portion 52 pivotally about the adjustment axis AA, and the adjustment structure 55, which is configured to adjust the relative position of the contact portion 52 and the operating portion 54 about the adjustment axis AA. This structure is advantageous when adjusting the distance of the operating portion 54 and the handlebar HB in accordance with the preference or hand size of the rider.

(9) The adjustment axis AA is coaxial with the lever axis LA. In this structure, the adjustment axis AA and the lever axis LA may be realized with a single pivot shaft, and the hydraulic operating device 10 may be simplified.

(10) The base member 20 includes the handlebar HB, which has the handlebar axis HBA. The hydraulic cylinder 30 extends along the bore axis BA, which is non-parallel to the handlebar axis HBA. The orientation of the hydraulic cylinder 30 allows for the hydraulic operating device 10 to be reduced in size along the handlebar axis HBA. The compact hydraulic operating device 10 is advantageous for obtaining a mount area on the handlebar HB for an accessory or a bicycle device other than the hydraulic operating device 10.

(11) The bore axis BA may be substantially perpendicular to the handlebar axis HBA. This structure is advantageous for reducing the size of the hydraulic operating device 10 along the handlebar axis HBA.

(12) The contact portion 52 includes the cam surface 52a, which is located between the second end portion 60b and the piston 40. This structure allows the cam surface 52a to be arranged toward the front of the actuated position with respect to the direction in which the piston 40 moves from the initial position to the actuated position. The location of the cam surface 52a essentially differs from that of a push-type hydraulic operating device configured to push a master piston with a cam surface from an initial position to an actuated position. Further, the piston return spring 34 may be located between the cam surface 52a and the piston 40 toward the front of the actuated position with respect to the direction in which the piston 40 moves from the initial position to the actuated position. US2007/0283691A1 describes an example of a piston push-type hydraulic operating device. US2007/0283691A1 is incorporated herein by reference.

The present invention is not limited to the above embodiment. For example, the embodiment may be modified as described below.

The base member 20, the hydraulic cylinder 30, the piston 40, and the adjustment structure 55 may be changed in shape, size, and structure.

The hydraulic operating device 10 may configure a hydraulic system with hydraulic components other than the brake caliper 120 such as a suspension controller.

It should be apparent to those skilled in the art that the present invention may be embodied in many other specific forms without departing from the spirit or scope of the invention. For example, some of the components may be omitted from the components disclosed in the above embodiments. Therefore, the present examples and embodiments are to be considered as illustrative and not restrictive, and the invention is not to be limited to the details given herein, but may be modified within the scope and equivalence of the appended claims.

The invention claimed is:

1. A hydraulic operating device comprising:
a base member;
a hydraulic cylinder provided on the base member and having a bore;
a piston located in the bore to move between an initial position and an actuated position;
a lever pivotally coupled to the base member around a lever axis for pivotal movement between a rest position and an operated position, the lever including a contact portion,
a connecting member that connects the lever to the piston and pulls the piston from the initial position to the actuated position in response to the pivotal movement of the lever from the rest position to the operated position, the connecting member having a first end portion coupled to the piston and a second end portion configured to displaceably contact with the contact portion of the lever; wherein
the connecting member further includes an intermediate portion between the first end portion and the second end portion, the intermediate portion having a first part fixedly coupled to the piston and a second part pivotally connected to the first part.

2. The hydraulic operating device according to claim 1, wherein the contact portion has a shape that decreases a distance between the lever axis and the second end portion in response to the pivotal movement of the lever from the rest position to the operated position.

3. The hydraulic operating device according to claim 2, wherein the second end portion of the connecting member includes at least one roller configured to rotatably contact with the contact portion.

4. The hydraulic operating device according to claim 3, wherein the contact portion includes at least one cam surface configured to contact with the at least one roller.

5. The hydraulic operating device according to claim 4, wherein the second end portion includes a first roller and a second roller.

6. The hydraulic operating device according to claim 5, wherein the first roller and the second roller are rotationally supported on opposite sides with respect to a longitudinal axis of the connecting member.

7. The hydraulic operating device according claim 1, wherein the lever further includes an operating portion configured to be pivotally coupled to the contact portion around an adjusting axis and an adjusting structure configured to adjust the relative position between the contact portion and the operating portion around the adjusting axis.

8. The hydraulic operating device according claim 7, wherein the adjusting axis is coaxial with the lever axis.

9. The hydraulic operating device according to claim 1, wherein the hydraulic operating device is for use with a handlebar having a handlebar axis,
the bore of the hydraulic cylinder has a bore axis, and
the base member is configured to attach to the handlebar and the bore axis of the bore of the hydraulic cylinder is non-parallel to the handlebar axis.

10. The hydraulic operating device according claim 9, wherein the bore axis is substantially perpendicular to the handlebar axis.

11. The hydraulic operating device according to claim 1, wherein the contact portion includes a cam surface located between the second end portion and the piston.

* * * * *